Feb. 8, 1944.     H. F. MAYNES     2,340,892
FISHING REEL
Filed Oct. 26, 1939     3 Sheets-Sheet 1
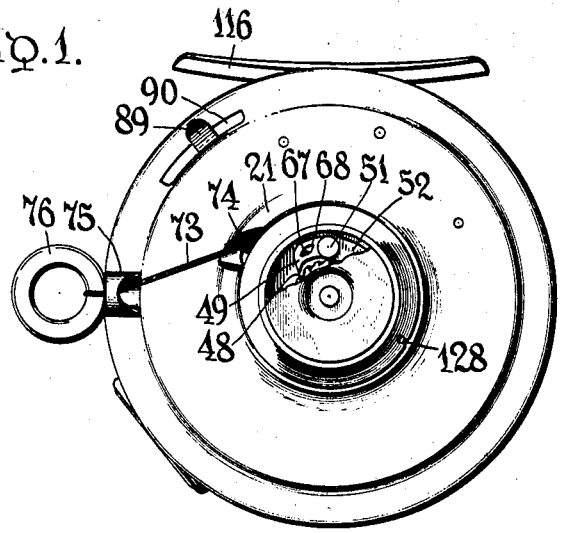
Fig. 1.
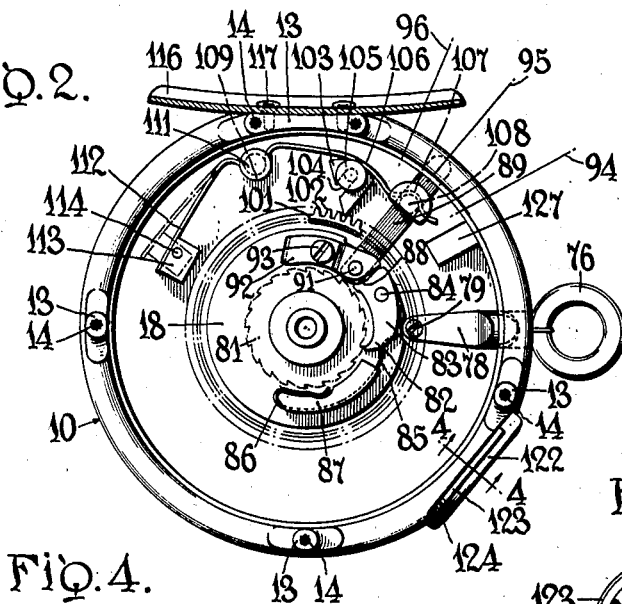
Fig. 2.
Fig. 4.
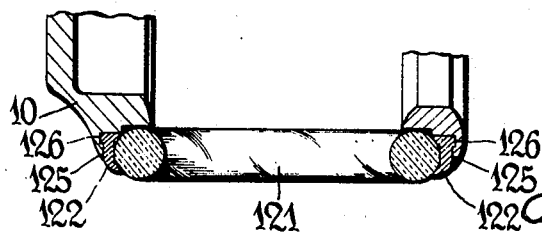
Fig. 3.
INVENTOR
Hyla F. Maynes,
BY Bean, Brooks, Buckley & Bean
ATTORNEYS Feb. 8, 1944. H. F. MAYNES 2,340,892
FISHING REEL
Filed Oct. 26, 1939 3 Sheets-Sheet 2
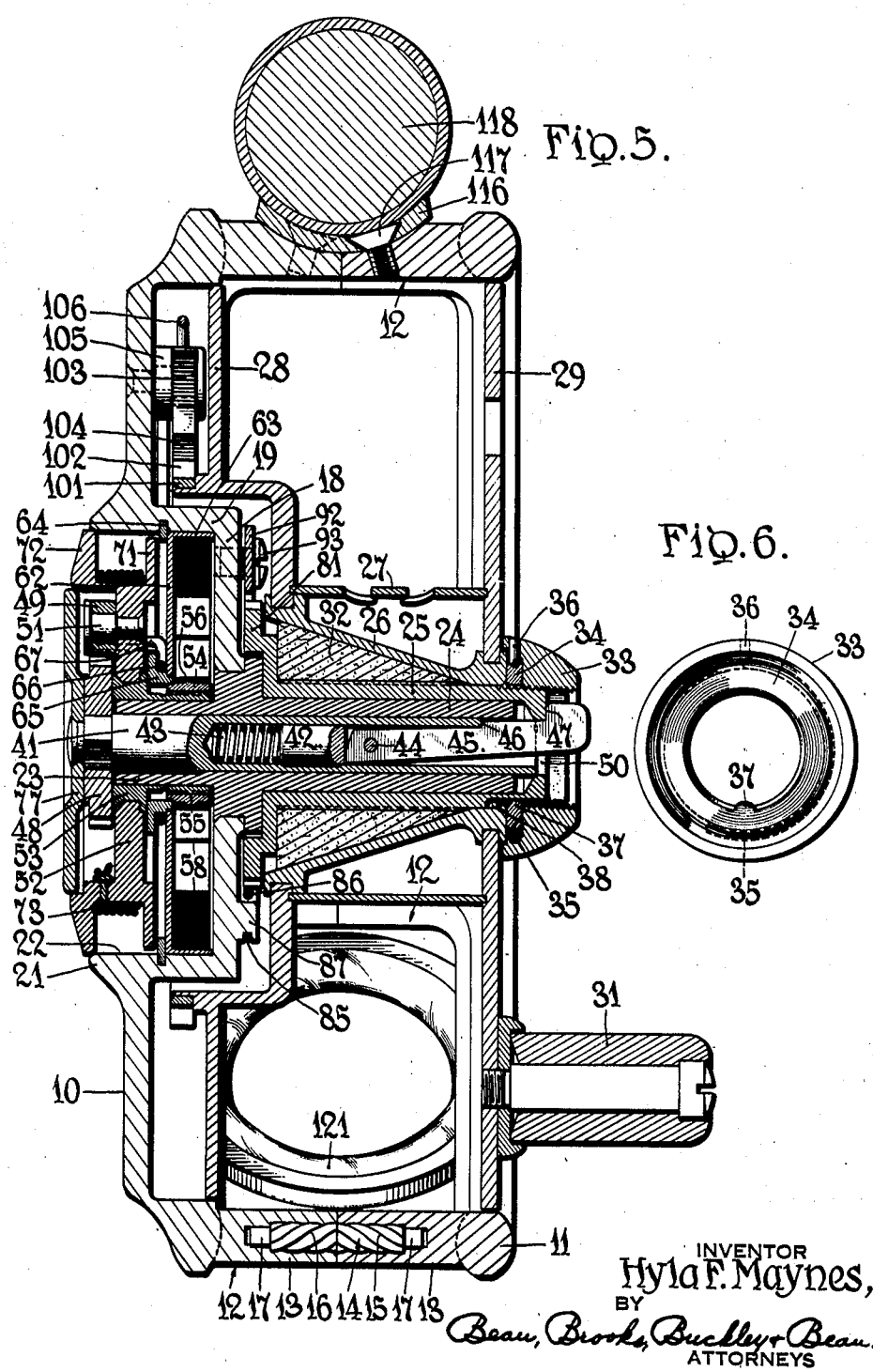

Feb. 8, 1944. H. F. MAYNES 2,340,892
FISHING REEL
Filed Oct. 26, 1939 3 Sheets-Sheet 3

INVENTOR
Hyla F. Maynes,
BY
Beau, Brooks, Buckley & Beau.
ATTORNEYS

Patented Feb. 8, 1944

2,340,892

UNITED STATES PATENT OFFICE 2,340,892

FISHING REEL

Hyla F. Maynes, North Tonawanda, N. Y., assignor of one-half to Emma C. Maynes, North Tonawanda, N. Y.

Application October 26, 1939, Serial No. 301,455

9 Claims. (Cl. 242—84.5)

This invention relates to a fishing reel and has particular relation to reels of the general type disclosed in my Patents No. 2,130,670 and No. 2,130,671, both granted on September 20, 1938, and No. 2,220,017, granted October 29, 1940, and constitutes an improvement in reels of this type.

The present invention contemplates an improved control mechanism for a clicking device and for a ratchet means that allows the spool to run freely in one direction only, wherein by moving a single control lever either the clicking device or the ratchet means may be rendered operative or inoperative, or both may be rendered ineffective. The clicking device may include a spring and an adjustable tensioning means therefor, whereby the character of the produced sound may be varied.

The novel features of the present invention, and the objects and advantages thereof, will appear from the following description of the typical embodiment shown in the accompanying drawings, wherein:

Fig. 1 is a side elevational view with a fragment of one part broken away;

Fig. 2 is a vertical sectional view;

Fig. 3 is an elevational view of a line guide employed in the reel construction;

Fig. 4 is a sectional view through the reel along a line indicated at 4—4 on Fig. 2;

Fig. 5 is an enlarged vertical sectional view in a plane at right angles to that of Fig. 2;

Fig. 6 is a front elevational view of a brake or clutch control unit shown in Fig. 5;

Figure 7:
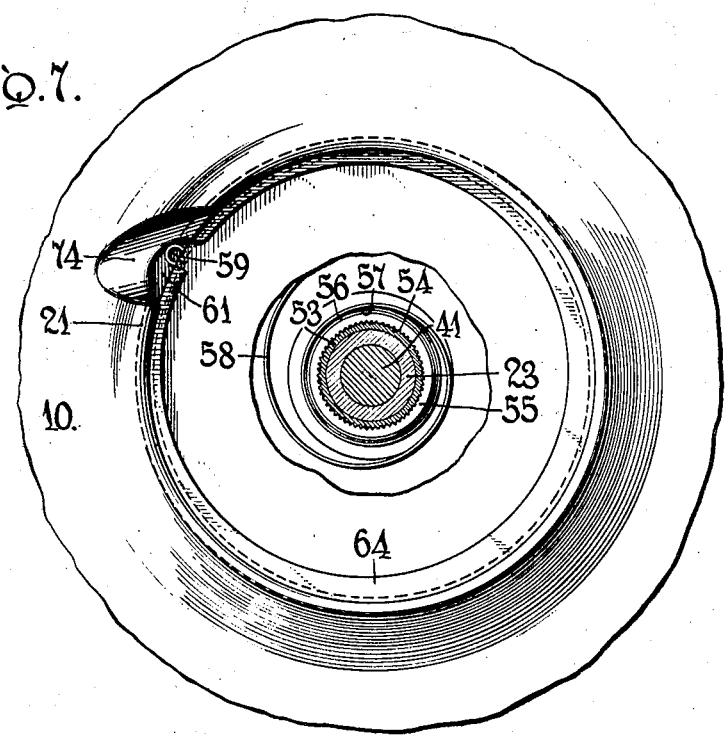
Fig. 7 is an enlarged fragmentary side elevation of the central portion of the reel with certain parts removed and fragments of other parts broken away.
Figure 8:
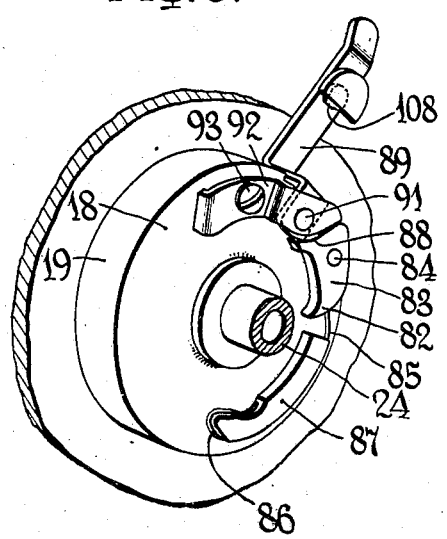
Fig. 8 is a perspective view of ratchet control means which are shown in side elevation in Fig. 2; and, Fig. 9 is a perspective of a pull cord guide shown in Figs. 1 and 2.
Figure 9:
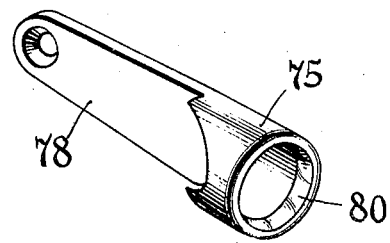

As shown in the drawings the reel has a frame consisting of a side plate 10 and a ring 11 spaced therefrom by pillars 12. The latter may comprise projections 13 formed integrally, as by die-casting, upon the side plate 10 and ring 11, each projection on the plate abutting an opposed projection on the ring and being joined thereto by a fastener 14, such fastener having screw portions 15 and 16 threaded in opposite directions and having guide portions 17 fitting bores formed in the projections. The construction of such a reel frame is described in my Patent No. 2,232,253, granted February 18, 1941.

The central portion 18 of the side plate 10 is offset inwardly from the outer portion of the plate by a tubular section 19, thus providing a recess 22 in the face of the plate, and around this recess extends an annular ridge 21 having a sloping outer face. Rigidly secured to inner portion 18 of the frame side plate is a sleeve having one end 23 extending into recess 22 and the other end, 24, extending approximately into the plane of ring 11 of the frame.

Mounted for rotation upon sleeve portion 24 is a spool consisting of an inner hub 25 in bearing contact with the sleeve portion, a concentric outer hub 26, a tubular frame 27 upon which the fishing line is wound, and inner and outer flanges 28 and 29, respectively, the outer flange 29 carrying a handle 31.

The outer hub 26 has a conical face engaging a brake or clutch lining 32 carried by the inner hub 25, and is held in engagement therewith by a cap 33 which is threaded upon the outer end of the hub 25. The cap has in its inner face a recess in which a washer 34 is retained by a spring 35 that extends partially around the washer, fitting in a groove in the periphery of the washer and a similar groove in the wall of the recess of the cap. An end portion 36 of the spring extends through a wall of the cap and anchors the spring against rotation.

The washer 34 has formed thereon a key 37 engaging in a keyway 38 in hub 25. By turning cap 33 the friction of hub 26 upon the lining 32 may be varied to adjust the torque required to rotate hub 26 relative to hub 25. In any adjusted position of the cap, the spring 35, by holding the cap relative to the washer 34, will prevent accidental turning of the cap.

Journaled in sleeve 23, 24 is a shaft 41 having a bore in which is slidable a plunger 42 backed by a spring 43. Pivoted at 44 in the bore is a key 45 having a shoulder 46 extending into, and abutting, the end wall of a keyway in the shaft. The key has a terminal portion extending through a slotted keyway 50 in a web extending across the outer end of inner hub 25, the terminal portion of the key having a shoulder 47 normally abutting the outer face of the web adjacent the slotted keyway. The spring backed plunger 42, engaging the key 45 to one side of pivot 44 normally retains the shoulders 46 and 47 in the engaged positions shown in Fig. 5.

Secured to the other end of shaft 41 is a ratchet wheel 48 whose ratchet teeth are engaged by a pawl 49 carried, on a pivot pin 51, by a pulley wheel 52. The hub 53 of the pulley is rotatable upon the sleeve portion 23 and has upon its inner end serrations 54 interengaging complementary serrations formed on the inner periphery of an annulus 55. The latter has a circumferential ridge 56, notched at 57, to engage in an opening formed in a spiral spring 58 near the inner end thereof, the outer end of the spring being formed into a loop 59 disposed in a recess 61 in wall portion 19 of the frame. The spring is coiled within a cup shaped member whose web 62 constitutes a closure across the recess 22 in the face of the frame, and whose peripheral flange 63 is telescoped within the circumferential wall of the recess, being retained therein in the position shown in Fig. 5 by a spring lock ring 64 and having an opening for passing the looped end portion 59 of the spring.

Fixed to the center of the web 62 is an annular hub 65, within which the member 55 rotates, and which supports a spring member 66 that frictionally engages it and has a finger 67 extending through a relatively large opening in the pulley 52 into engagement with a cam opening 68 in pawl 49. Member 66, 67 serves to shift the pawl into and out of engagement with the teeth of ratchet wheel 48 at the initiation of counterclockwise and clockwise movements, respectively, of pulley 52, as the parts are viewed in Fig. 1, due to movement of the pulley relative to member 66, 67 which frictionally engages stationary hub 65.

Secured to and wound upon the pulley, between its inner and outer flanges 71 and 72, is a pull cord 73 whose free end extends through a recess 74 in the ridge 21 on the face of the frame and through a guide ring 75, and having at its extremity a finger piece 76. The guide ring 75 may be formed with a tail portion 78 extending through an opening in the frame and secured to the frame by fastener 79. Preferably an agate annulus 80 is seated within ring 75.

The outer flange 72 of the pulley forms a closure across the mouth of the recess 22, cooperating with ridge 21 in providing upon the reel a clean side face which will not snag a fish line or the like. A closure disc 77 secured upon the end of shaft 41 encloses the space in the face of the pulley containing the ratchet wheel 48 and pawl 49.

An inner flange 81 upon inner hub member 25 constitutes a ratchet wheel, having about its periphery ratchet teeth engageable by end portion 82 of a pawl 83 which is pivoted by pin 84 to central wall portion 18 of the frame. The pawl is engaged and normally pressed into engagement with wheel 81 by a spring 85 which is supported by having a loop portion 86 thereof clipped over a supporting projection 87 formed on the frame portion 18.

On the opposite side of pivot 84 from end 82, the pawl 83 has a cam portion 88 engaged by the end of a lever 89, the latter being pivoted upon a pin 91 carried by frame portion 18, and held upon the pin by a resilient member or leaf spring 92 secured by fastener 93 to the frame portion 18 and having its free end extending through a slot 90 in the frame. The lever is shiftable to any one of three positions, indicated by center lines 94, 95 and 96, the lever being shown in Fig. 2 in position 95. When in position 94 the cam portion 88 of the pawl is disengaged from the lever, so that spring 85 presses the pawl into engagement with the ratchet wheel 81. In this position the free end of member 92 presses firmly against the lever, holding it against accidental movement. When in either of positions 96 or 95 the cam portion 88 is engaged by the lever, holding the pawl disengaged from the ratchet wheel. In either of these positions the pressure of spring 85, exerted through the pawl 83, will tend to hold the lever 89 against accidental displacement.

Secured to the flange 24 of the spool is a ring wheel 101 having undulations in the form of teeth 102 formed thereabout for engagement by a clicker member 103. The latter is generally triangular in shape and has a slot 104 through which extends a pivot stud 105 that is carried by portion 10 of the frame.

A spring wire 106 engages the upper surface of the clicker member 103, the end of the wire adjacent the clicker being bent to define a bight portion 107. The lever 89 has a pin 108 upon which the end portion of the wire bears, the pin entering the bight portion 107 when the lever is in its central position, 95. The intermediate portion of wire 106 has a bight portion 109 engaging the under surface of a stud 111 carried by the frame portion 10, and the end 112 of the wire is engaged and tensioned by a block 113 which is pivoted eccentrically at 114 to the frame. Since each of the four side faces of the block is at a different distance from the pivot 114 than each other face, the spring wire may be adjusted to any of four different degrees of tension by moving the block about its pivot. In Fig. 2 the parts are in the adjustment of least tension in the full line illustration and the position of maximum tension in broken line illustration.

The reel may be provided with a saddle 116 connected to the reel frame by fasteners 117 and by which the reel may be secured to a rod 118 (Fig. 5) in any suitable manner. Fishing line may be wound on the spool frame 27 between flanges 28 and 29 by rotation of the spool in a clockwise direction as the parts are viewed in Fig. 1. The line may be guided through a ring 121 of suitable wear resisting material, which is preferably mounted in an annulus 122 having opposed flanged portions 123 provided with stop lugs 124.

The frame portions 10 and 11 are, as shown in Fig. 4, provided with recesses 125 to receive the annulus, the recesses having depressions 126 to receive flanges 123. The guide ring 121 may be attached to the frame by placing the portions of annulus 122 between flanges 123 in the recesses 125 and then rotating the ring to move flanges 123 into the depressions 126, a motion which is limited by stop lugs 124 abutting the frame portions adjacent depressions 126. The ring and its supporting annulus, normally retained against rotation in the frame by friction, may be released from the frame by partial rotation in the opposite direction.

In operation, with the control lever 89 in the middle position 95 shown in Fig. 2, the spool may be rotated freely in either direction, such rotation being accompanied by clicking of member 103 upon the serrated surface of wheel 101. As heretofore mentioned the intensity of the clicking sound may be predetermined to suit the operator, by adjusting block 113 about its pivot 114 to vary the tension of spring 106.

Line may be wound upon the spool either by rotating the handle 31 or by actuating the pull cord 73, alternately withdrawing it and allowing it to be retracted. In operation of the latter outward, unwinding motion of the pull cord will cause ratchet pawl and wheel 49, 48 to engage, rotating shaft 41, key 45, and the inner and outer hub members 25 and 26, provided that the latter are engaged under sufficient pressure by reason of proper adjustment of member 33. When the pull cord moves inwardly, by action of spring 58, the pawl 49 will release the ratchet wheel 52 so that the pulley may rotate free of the shaft 41.

When the lever 89 is moved to the position indicated by line 96 in Fig. 2, the spring wire 106 will be lifted from clicker 103, so that the spool may rotate substantially noiselessly. In this position as in that shown in Fig. 2, the ratchet pawl 82, 83 is held disengaged from wheel 81.

By moving the lever 89 to the position indicated by center line 94 in Fig. 2, wherein it abuts stop 127, the ratchet means 82, 83, 81 are engaged, thereby allowing free rotation of the spool to wind in line (clockwise rotation in Figs. 1 and 2) but preventing rotation of the inner hub member 25 in the opposite direction, and permitting rotation of the spool proper in such opposite direction only to the extent that the outer hub 26 may rotate with respect to the inner hub, the frictional resistance to such motion being determined by the adjustment of member 33.

To remove the hub and spool assembly, or to release the shaft 41 for axial displacement, the key 45 may be depressed to release shoulders 46 and 47 from the engaged relationships shown in Fig. 5. When the shaft is thus displaced the pulley 52 may, of course, also be displaced axially.

In order to release or increase the tension of the spring 58 the portion of the pull cord between the pulley and guide ring 75 may be extended through a notch 128 which is provided in the periphery of flange 72 of pulley 52, after which the pulley may be allowed to rotate (clockwise in Fig. 1) or may be rotated (counterclockwise) to the degree necessary to effect the release or increase of tension desired.

It will be understood that the reel structure herein shown and described is merely illustrative of the several features of the invention, and that these features may be employed either severally or jointly in other embodiments without departing from the spirit of the invention or the scope of the appended claims.

I claim:

1. In a fishing reel, a frame and a spool mounted for rotation thereon, a brake member frictionally engaging the spool and adapted to rotate therewith, a ratchet wheel rotatable with the brake member, a serrated member rotatable with the spool, pawl means mounted on the frame and means for pressing the pawl means into engagement with said ratchet wheel to prevent rotation of the brake member in one direction, a sound producing member and resilient means for pressing it into engagement with said serrated member, and a control element movably mounted on the frame to control the pawl and sound producing member, said control element being engageable with the pawl means to move the latter from engaged relation with the ratchet wheel and being engageable with said resilient means to relieve the pressure of said resilient means upon said sound producing member.

2. In a fishing reel, a frame and a spool mounted for rotation thereon, a ratchet wheel adapted for rotation with the spool, a serrated member adapted for rotation with the spool, pawl means for engagement with the ratchet wheel to prevent free rotation of the spool in one direction, a second member for engagement with said serrated member for producing sound upon rotation of the spool and pressure means for effecting such engagement, and a control for said pawl means and said second member comprising a control element carried by said frame and movable into engagement with the pawl means for releasing said pawl means from the ratchet wheel and also movable into engagement with said pressure means to release said second member from sound producing engagement with said serrated member.

3. In a fishing reel, a frame and a spool mounted for rotation thereon, a ratchet mechanism adapted to permit free rotation of the spool in one direction and adapted to restrict rotation of the spool in the opposite direction, a sound producing device operated by and upon rotation of the spool, and control means for said ratchet mechanism and said sound producing device, said control means comprising a control member operably associated with the ratchet mechanism and with said sound producing device and movable selectively to render the ratchet mechanism ineffective and to render the sound producing device effective and ineffective.

4. In a fishing reel, a frame and a spool mounted for rotation thereon, a ratchet mechanism adapted to permit free rotation of the spool in one direction and adapted to restrict rotation of the spool in the opposite direction, a sound producing device adapted to be operated by and upon rotation of the spool, and control means for said ratchet mechanism and sound producing device, said control means including a control member movable upon the frame and having a part engageable with said ratchet mechanism for rendering the latter ineffective to restrict rotation of the spool in said opposite direction, and said control member having a part engageable with said sound producing mechanism to render the mechanism ineffective.

5. In a fishing reel, a frame and a spool mounted for rotation thereon, a ratchet wheel adapted for rotation with the spool, a sound producing device adapted to be operated by and upon rotation of the spool, and control means for said ratchet mechanism and sound producing device, said control means including a control member movable upon the frame to different positions, said control member having a part engageable with the ratchet mechanism for rendering the latter inoperative in one position of the control member, and having a part engageable with the sound producing device to render the same ineffective in another position of the control member.

6. In a fishing reel, a frame and a spool mounted for rotation thereon, a ratchet wheel adapted for rotation with the spool, a sound producing device adapted to be operated by and upon rotation of the spool, and control means for said ratchet mechanism and sound producing device, said control means including a control member movable upon the frame to different positions, said control member having a part engageable with the ratchet mechanism for rendering the latter inoperative in one position of the control member, and having a part engageable with the sound producing device to render the device ineffective in the production of sound in another position of the control member.

7. In a fishing reel, a frame, a ratchet wheel and a serrated wheel mounted for rotation upon the frame, pawl means for engaging said ratchet wheel and a member for engaging said serrated wheel, spring means for pressing said member against the serrated wheel, and a control member mounted on the frame and movable into engagement with the pawl means for holding the latter from engagement with the ratchet wheel, said control member being movable into engagement with the spring means for relieving the pressure thereof upon said member.

8. In a fishing reel, a frame, a ratchet wheel and a serrated wheel mounted for rotation upon the frame, pawl means for engaging said ratchet wheel, a member for engaging said serrated wheel for the production of sound, an element for pressing said member into engagement with said serrated wheel, a lever pivoted to said frame for movement into engagement with said pawl means and coacting with the latter when so engaged to prevent engagement of the pawl means with said ratchet wheel, and while so engaged adapted to be shifted to relieve the pressure of said element upon said member.

9. In a fishing reel, a frame and a spool mounted for rotation thereon, a ratchet wheel adapted for rotation with the spool, a serrated member adapted for rotation with the spool, a spring pressed pawl for engagement with the ratchet wheel to restrict rotation of the spool in one direction, a clicker member adapted to engage said serrated member for the production of sound, a spring pivoted medially of its ends to the frame, an element adapted for engagement with the spring to one side of the pivot, said element being pivoted eccentrically to the frame and having plural faces adapted to engage the spring to provide a plurality of different tensions for the spring, the portion of the spring to the other side of said pivot engaging said clicker for pressing it against said serrated member, and control means for said pawl and said clicker member, said control means comprising a control member engageable with the pawl for holding the latter disengaged from the ratchet wheel, and said control member being engageable with said spring to hold the spring removed from a position wherein it presses the clicker against the serrated member for the production of sound.

HYLA F. MAYNES.